April 1, 1952     A. J. FITZGERALD     2,591,346

GRILL STRUCTURE

Filed June 13, 1950

Inventor:
Albert J. Fitzgerald,
by Merton O. Moore
His Attorney.

Patented Apr. 1, 1952

2,591,346

UNITED STATES PATENT OFFICE 2,591,346

GRILL STRUCTURE

Albert J. Fitzgerald, Syracuse, N. Y., assignor to General Electric Company, a corporation of New York Application June 13, 1950, Serial No. 167,815

2 Claims. (Cl. 189—82)

My invention relates to grill structures and particularly to such grills intended for ornamental purposes.

It has for one of its objects to provide a secure jointure between grill members of different shape adapted to prevent vibration therebetween and which is economical to manufacture and assemble.

A further object is to provide such a jointure between L members and channel members in which the securing means is concealed and does not interfere with the desired decorative appearance of the grill.

Figure 1:
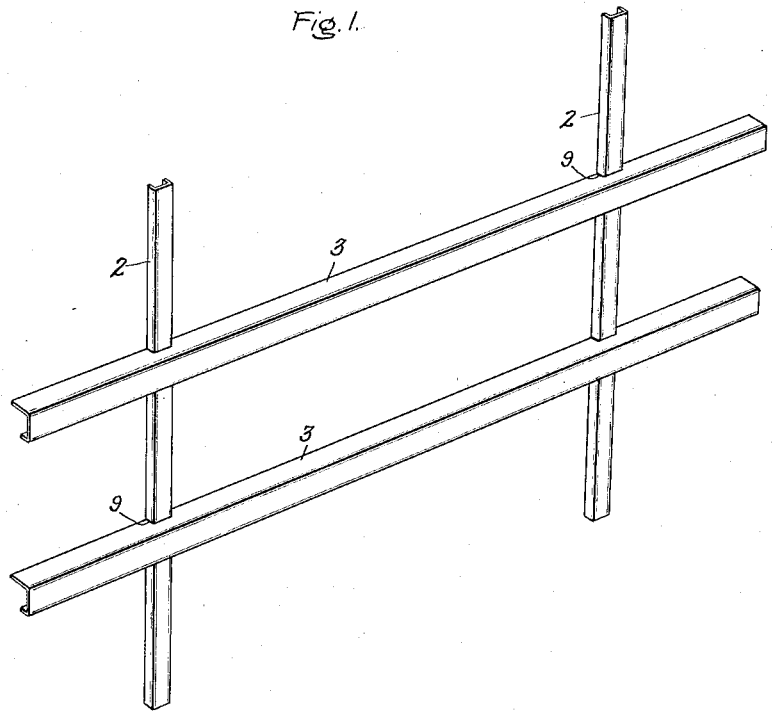
Figure 3:
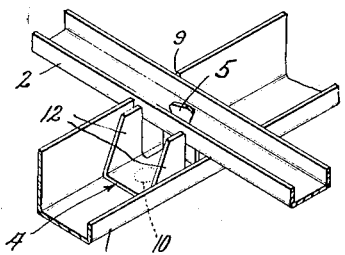
Figure 2:
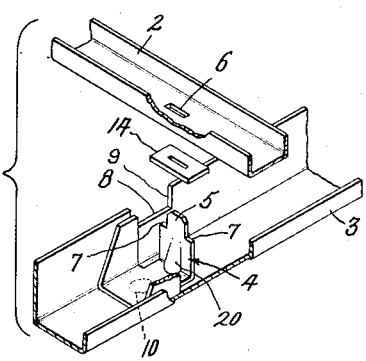
Figure 4:
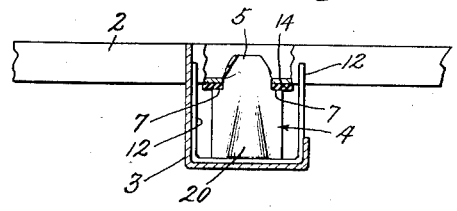

The novel features which I believe to be characteristic of my invention are set forth with particularity in the appended claims. My invention itself, however, may best be understood by reference to the following description taken in connection with the accompanying drawing in which Fig. 1 represents a decorative grill employing my invention; Fig. 2 is an exploded view of the jointure of certain members employed in such a grill; Fig. 3 is a rear view of the grill at the jointure; and Fig. 4 is a detail thereof.

Referring to Fig. 1, this figure represents a decorative or ornamental grill such as may be used in the sidewall of the cabinet of a radio or television set as, for example, over the opening adjacent the loudspeaker. It comprises vertical channel members 2, horizontal members 3 which may be of channel shape or of L shape. Since if of channel shape the lower portion of the members 3 contribute nothing to the ornamental appearance of the grill and since an economy of materials may be effected by using L shape members, it is preferred that these members be of L shape as shown.

These members are secured together in the manner illustrated in Figs. 2 and 3. Spot welded to the back of the member 3 is a resilient bracket 4 having a projection 5 extending thru an aperture 6 in the bottom of the channel of the channel member. This member 4 also has shoulders 7 at the same level as the bottom 8 of the notch 9 cut in the horizontal arm of the L shape member.

The channel 6 is placed in position in the notch 9 as better shown in Fig. 3 with the projection 5 extending thru the aperture 6 in the channel 2. This projection 5 may then be given a twist against the sidewall of aperture 6 to hold the channel in place and to secure it down upon the shoulders 7 and upon the bottom 8 of the notch 9.

This member 4, which is spot welded, as indicated at 10 to the backside of the L shaped member 3 has arms 12 projecting upward as shown in Fig. 3 and bearing directly upon the side of the channel member 2 so as to hold that channel member in its desired relationship to the member 3 which, in all figures of the drawing, is a right angle relationship, although, of course, it may be at other angles.

It is important in the assembly of the grill that the upper righthand edge of the arm 12 of member 4 lie within the notch 9 cut in the L member 3 and that the distance longitudinally of member 3 between this edge and the projection 5 be such that member 2 is held tightly between the arm 12 and the projection 5 with member 4 in some degree of stress. This resilience is increased by suitably shaping member 4 as indicated at 20. The result is that member 2 is securely held against vibration by member 4 even though it may fit loosely in the notch 8.

An important advantage obtained by this attachment means resides in the fact that there is little danger of marring the finish at any conspicuous point on channel member 2 in the assembly operation. This is due to the fact that the points of engagement between channel 2 and the holding member 4 are within member 3 and at positions that are invisible from positions from which the grill is ordinarily observed.

A twist in the member 5 together with the side projections 12 of the member 4 are ordinarily adequate to hold the channel members 2 in desired relation to the L shape members 3. In the event, however, of any vibration occurring, a suitable washer 14 as of rubber may be inserted between the bottom of the channel member 2 and the shoulders 7 of the members 4. This washer is indicated at 14 in Figs. 2 and 4.

Fig. 4 is a view looking endwise of the member 3 and shows one side of the channel member cut away in the plane of the member 4.

It will be seen that by use of the member 4 the channel members 2 are held securely in their space relation with respect to each other and at the same time the member 2 may be of L shape as distinct from the channel shape thereby conserving all or any desired part of the material which would be employed in one side of the channel if the member 2 were of channel shape.

While I have shown a particular embodiment of my invention certain modifications may be made and I contemplate by the appended claims to cover all such modifications as fall within the true spirit and scope of my invention.

What I claim as new and desire to secure by Letters Patent of the United States is:

1. The combination, in a decorative grill, of a pair of intersecting grill members, one of L shape with one arm of the L in the face area of the grill, and the other of channel shape with the bottom of the channel in the face area of the grill, the opposite edge of said L member having a notch receiving the bottom of said channel, a resilient sheet metal member secured to the back surface of said first arm of the L member and between said members, said sheet metal member having a projection extending through a slot in said channel bottom and having a shoulder on which said bottom rests, said projection having a twist to cause said bottom to bear against said shoulder and said notch.

2. The combination, in a decorative grill, of a pair of intersecting grill members, one of L shape with one arm of the L in the face area of the grill, and the other of channel shape with the bottom of the channel in the face area of the grill, the opposite edge of said L member having a notch receiving the bottom of said channel, a resilient sheet metal member secured to the back surface of said first arm of the L member and between said members, said sheet metal member having a projection extending through a slot in said channel bottom and having a shoulder on which said bottom rests, said projection having a twist to cause said bottom to bear against said shoulder and said notch, said resilient member having arms engaging the side of said channel member to hold it in fixed relation to said L member.

ALBERT J. FITZGERALD.

REFERENCES CITED

The following references are of record in the file of this patent:

UNITED STATES PATENTS

| Number | Name | Date |
| --- | --- | --- |
| 362,008 | Hodges | Apr. 26, 1887 |
| 1,258,147 | Sargent | Mar. 5, 1918 |
| 1,778,337 | Pratt | Oct. 14, 1930 |